United States Patent
Wang et al.

(10) Patent No.: US 12,488,759 B2
(45) Date of Patent: Dec. 2, 2025

(54) SHIFT REGISTER UNIT, DRIVE CONTROL CIRCUIT, DISPLAY APPARATUS AND DRIVING METHOD

(71) Applicants: Chengdu BOE Optoelectronics Technology Co., Ltd., Chengdu (CN); BOE Technology Group Co., Ltd., Beijing (CN)

(72) Inventors: Benlian Wang, Beijing (CN); Yue Long, Beijing (CN); Hai Zheng, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/688,163

(22) PCT Filed: Nov. 29, 2022

(86) PCT No.: PCT/CN2022/134975
§ 371 (c)(1),
(2) Date: Feb. 29, 2024

(87) PCT Pub. No.: WO2024/113153
PCT Pub. Date: Jun. 6, 2024

(65) Prior Publication Data
US 2025/0124880 A1     Apr. 17, 2025

(51) Int. Cl.
*G09G 3/3266* (2016.01)
*G09G 3/36* (2006.01)
*G11C 19/28* (2006.01)

(52) U.S. Cl.
CPC ........ *G09G 3/3266* (2013.01); *G09G 3/3677* (2013.01); *G11C 19/287* (2013.01);
(Continued)

(58) Field of Classification Search
CPC ........ G09G 2310/0267; G09G 3/3266; G09G 3/20; G09G 2310/0286
See application file for complete search history.

(56) References Cited

U.S. PATENT DOCUMENTS

| | | | |
|---|---|---|---|
| 7,528,811 B2 * | 5/2009 | Iwabuchi | G09G 3/20 345/103 |
| 12,051,386 B2 * | 7/2024 | Feng | G09G 5/006 |

(Continued)

FOREIGN PATENT DOCUMENTS

| | | |
|---|---|---|
| CN | 108346405 A | 7/2018 |
| CN | 109147635 A | 1/2019 |

(Continued)

*Primary Examiner* — Van N Chow
(74) *Attorney, Agent, or Firm* — ArentFox Schiff LLP; Michael Fainberg

(57) ABSTRACT

Disclosed are a shift register unit (SRn), a drive control circuit, a display apparatus and a driving method. The shift register unit includes an input circuit, a control circuit, a first output circuit a second output circuit, and a noise reduction circuit configured, in response to a signal from the noise reduction signal terminal (VEL), to provide a signal from a third reference voltage signal terminal (V3) to the second node (N2) and to control the second output circuit to stop signal output.

17 Claims, 9 Drawing Sheets

(52) U.S. Cl.
CPC .............. *G09G 2310/0286* (2013.01); *G09G 2320/0247* (2013.01)

(56) References Cited

U.S. PATENT DOCUMENTS

| | | |
|---|---|---|
| 2010/0177087 A1 | 7/2010 | Han |
| 2015/0262528 A1* | 9/2015 | Takahara ............ G09G 3/3258 345/212 |
| 2018/0374410 A1 | 12/2018 | Zhu et al. |
| 2020/0066209 A1 | 2/2020 | Zhang et al. |
| 2021/0193007 A1 | 6/2021 | Cheng et al. |
| 2023/0178046 A1 | 6/2023 | Shang et al. |

FOREIGN PATENT DOCUMENTS

| | | |
|---|---|---|
| CN | 109616056 A | 4/2019 |
| CN | 110956919 A | 4/2020 |
| CN | 111583885 A | 8/2020 |
| KR | 10-2010-0083321 A | 7/2010 |
| KR | 10-2015-0070840 A | 6/2015 |

\* cited by examiner

SHIFT REGISTER UNIT, DRIVE CONTROL CIRCUIT, DISPLAY APPARATUS AND DRIVING METHOD

The present application is a National Stage of International Application No. PCT/CN2022/134975, filed on Nov. 29, 2022, the entire contents of which are incorporated by reference in the present application.

TECHNICAL FIELD

The disclosure relates to the field of display technology, and particularly relates to a shift register unit, a drive control circuit, a display apparatus and a driving method.

BACKGROUND

With the rapid development of display technology, display panels are developed toward high integration and low cost. A drive control circuit is integrated on an array substrate of a display panel by the technology of Gate Driver on Array (GOA) to realize a scanning drive for the display panel. At present, the drive circuit generally includes a plurality of cascaded shift register units. However, output of the shift register unit is unstable, resulting in abnormal display.

SUMMARY

Embodiments of the disclosure provide a shift register unit. The shift register unit includes: an input circuit configured to provide, in response to a signal from a first clock signal terminal, a signal from the input signal terminal to a first node; a control circuit configured to control a signal at a second node; a first output circuit configured to, in response to a signal from the first node, provide a signal from a first reference voltage signal terminal to an output signal terminal; a second output circuit configured to, in response to a signal from the second node, provide a signal from a second reference voltage signal terminal to the output signal terminal; and a noise reduction circuit configured to, in response to a signal from the noise reduction signal terminal, provide a signal from a third reference voltage signal terminal to the second node to control the second output circuit to stop outputting a signal.

In some embodiments of the disclosure, the noise reduction circuit includes a first transistor. A gate of the first transistor is coupled to the noise reduction signal terminal, a first electrode of the first transistor is coupled to the third reference voltage signal terminal, and a second electrode of the first transistor is coupled to the second node.

In some embodiments of the disclosure, the first node includes a first sub-node and a second sub-node. The shift register unit further includes a conduction circuit. The first sub-node is coupled to the second sub-node via the conduction circuit, and the conduction circuit is configured to, in response to a signal from a fourth reference voltage signal terminal, conduct the first sub-node with the second sub-node. The input circuit is further configured to, in response to the signal from the first clock signal terminal, provide the signal from the input signal terminal to the first sub-node. The first output circuit is further configured to, in response to a signal at the second sub-node, provide the signal from the first reference voltage signal terminal to the output signal terminal.

In some embodiments of the disclosure, the control circuit includes a first control circuit, a second control circuit, and a third control circuit. The first control circuit is configured to, in response to the signal from the first clock signal terminal, provide a signal from a fifth reference voltage signal terminal to a third node, and in response to the signal at the first sub-node, provide the signal from the first clock signal terminal to a third node. The second control circuit is configured to control the signal at the second sub-node and a signal at a fourth node. The third control circuit is configured to, in response to the signal at the fourth node and a signal from a second clock signal terminal, provide the signal from the second clock signal terminal to the second node, and in response to the signal at the first sub-node, provide the signal at the second reference voltage signal terminal to the second node.

In some embodiments of the disclosure, the first control circuit includes: a second transistor and a third transistor. A gate of the second transistor is coupled to the first clock signal terminal, a first electrode of the second transistor is coupled to the fifth reference voltage signal terminal, and a second electrode of the second transistor is coupled to the third node. A gate of the third transistor is coupled to the first sub-node, a first electrode of the third transistor is coupled to the third node, and a second electrode of the third transistor is coupled to the first clock signal terminal.

In some embodiments of the disclosure, the second control circuit is further configured to, in response to a signal from the fourth reference voltage signal terminal, provide a signal at the third node to the fourth node; in response to the signal at the third node, provide the signal from the second reference voltage signal terminal to a fifth node; and in response to the signal at the second sub-node provide the signal from the second clock signal terminal to the fifth node.

In some embodiments of the disclosure, the second control circuit includes: a fourth transistor, a fifth transistor, a sixth transistor, and a first capacitor. A gate of the fourth transistor is coupled to the fourth reference voltage signal terminal, a first electrode of the fourth transistor is coupled to the third node, and a second electrode of the fourth transistor is coupled to the fourth node. A gate of the fifth transistor is coupled to the third node, a first electrode of the fifth transistor is coupled to the second reference voltage signal terminal, and a second electrode of the fifth transistor is coupled to the fifth node. A gate of the sixth transistor is coupled to the second sub-node, a first electrode of the sixth transistor is coupled to the fifth node, and a second electrode of the sixth transistor is coupled to the second clock signal terminal. A first electrode of the first capacitor is coupled to the fifth node, and the second electrode of the first capacitor is coupled to the second sub-node.

In some embodiments of the disclosure, the second control circuit is further configured to: in response to a signal from the fourth reference voltage signal terminal, provide a signal at the third node to the fourth node; in response to the signal at the fourth node, provide the signal from the second reference voltage signal terminal to a fifth node; and in response to the signal at the second sub-node, provide the signal from the second clock signal terminal to the fifth node.

In some embodiments of the disclosure, the second control circuit includes: a fourth transistor, a fifth transistor, a sixth transistor, and a first capacitor. A gate of the fourth transistor is coupled to the fourth reference voltage signal terminal, a first electrode of the fourth transistor is coupled to the third node, and a second electrode of the fourth transistor is coupled to the fourth node. A gate of the fifth transistor is coupled to the fourth node, a first electrode of the fifth transistor is coupled to the second reference voltage signal terminal, and a second electrode of the fifth transistor is coupled to the fifth node. A gate of the sixth transistor is coupled to the second sub-node, a first electrode of the sixth transistor is coupled to the fifth node, and a second electrode of the sixth transistor is coupled to the second clock signal terminal. A first electrode of the first capacitor is coupled to the fifth node, and the second electrode of the first capacitor is coupled to the second sub-node.

In some embodiments of the disclosure, the third control circuit includes a seventh transistor, an eighth transistor, a ninth transistor, and a second capacitor. A gate of the seventh transistor is coupled to the fourth node, a first electrode of the seventh transistor is coupled to the second clock signal terminal, a second electrode of the seventh transistor is coupled to a first electrode of the eighth transistor. A gate of the eighth transistor is coupled to the second clock signal terminal, and a second electrode of the eighth transistor is coupled to the second node. A gate of the ninth transistor is coupled to the first sub-node, a first electrode of the ninth transistor is coupled to the second node, and a second electrode of the ninth transistor is coupled to the second reference signal terminal. A first electrode of the second capacitor is coupled to the fourth node, and the second electrode of the second capacitor is coupled to the first electrode of the eighth transistor.

In some embodiments of the disclosure, the input circuit includes a tenth transistor. A gate of the tenth transistor is coupled to the first clock signal terminal, a first electrode of the tenth transistor is coupled to the input signal terminal, and a second electrode of the tenth transistor is coupled to the first sub-node.

In some embodiments of the disclosure, the first output circuit includes an eleventh transistor. A gate of the eleventh transistor is coupled to the second sub-node, a first electrode of the eleventh transistor is coupled to the output signal terminal, and a second electrode of the eleventh transistor is coupled to the first reference voltage signal terminal.

In some embodiments of the disclosure, the second output circuit includes a twelfth transistor and a third capacitor. A gate of the twelfth transistor is coupled to the second node, a first electrode of the twelfth transistor is coupled to the second reference voltage signal terminal, and a second electrode of the twelfth transistor is coupled to the output signal terminal. A first electrode of the third capacitor is coupled to the second node, and a second electrode of the third capacitor is coupled to the second reference voltage signal terminal.

In some embodiments of the disclosure, the conduction circuit includes a thirteenth transistor. A gate of the thirteenth transistor is coupled to the fourth reference voltage signal terminal, a first electrode of the thirteenth transistor is coupled to the first sub-node, and a second electrode of the thirteenth transistor is coupled to the second sub-node.

In some embodiments of the disclosure, the second reference voltage signal terminal and the third reference voltage signal terminal are the same one signal terminal.

Embodiments of the disclosure further provide a shift register unit. The shift register unit includes: an input circuit, coupled to an input signal terminal and a first node and configured to provide a signal from the input signal terminal to the first node; a control circuit, coupled to a second node and configured to control the second node; a first output transistor; where a gate of the first output transistor is coupled to the second node, a first electrode of the first output transistor is coupled to a second reference voltage signal terminal, and a second electrode of the first output transistor is coupled to an output signal terminal; and the first output transistor is configured to, in response to a signal at the second node, provide a signal from the second reference voltage signal terminal to the output signal terminal; and a noise reduction transistor; where a gate of the noise reduction transistor is coupled to a noise reduction signal terminal, a first electrode of the noise reduction transistor is coupled to a third reference voltage signal terminal, and a second electrode of the noise reduction transistor is coupled to the second node; the noise reduction transistor is configured to, in response to a signal from the noise reduction signal terminal, provide a signal from the third reference voltage signal terminal to the second node.

In some embodiments of the disclosure, the shift register unit further includes a third capacitor. A first electrode of the third capacitor is coupled to the second reference voltage signal terminal, and a second electrode of the third capacitor is coupled to the second electrode of the noise reduction transistor.

In some embodiments of the disclosure, the shift register unit further includes a second output transistor. A gate of the second output transistor is couple to the first node, a first electrode of the second output transistor is coupled to the first reference voltage signal terminal, and a second electrode of the second output transistor is coupled to the output signal terminal. The second output transistor is configured to, in response to the signal at the first node, provide a signal from the first reference voltage signal terminal to the output signal terminal.

In some embodiments of the disclosure, the second reference voltage signal terminal and the third reference voltage signal terminal are the same one signal terminal.

Embodiments of the disclosure further provide a drive control circuit including a plurality of shift register units mentioned above in cascade. An input signal terminal of a first stage of shift register unit is couple to a frame trigger signal terminal. In every two stages of shift register units that are adjacent to each other, an input signal terminal of a next stage of shift register unit is coupled to an output signal terminal of a shift register unit preceding the next stage of shift register unit.

Embodiments of the disclosure further provide a display apparatus including the above drive control circuit.

Embodiments of the disclosure further provide a driving method of the above shift register unit, including: in a noise reduction stage: in response to the signal at the first node, providing, by the first output circuit, the signal from the first reference voltage signal terminal to the output signal terminal; and in response to the signal from the noise reduction signal terminal, providing, by the noise reduction circuit, the signal from the third reference voltage signal terminal to the second node to control the second output circuit to stop outputting the signal.

DETAILED DESCRIPTION

Figure 1:
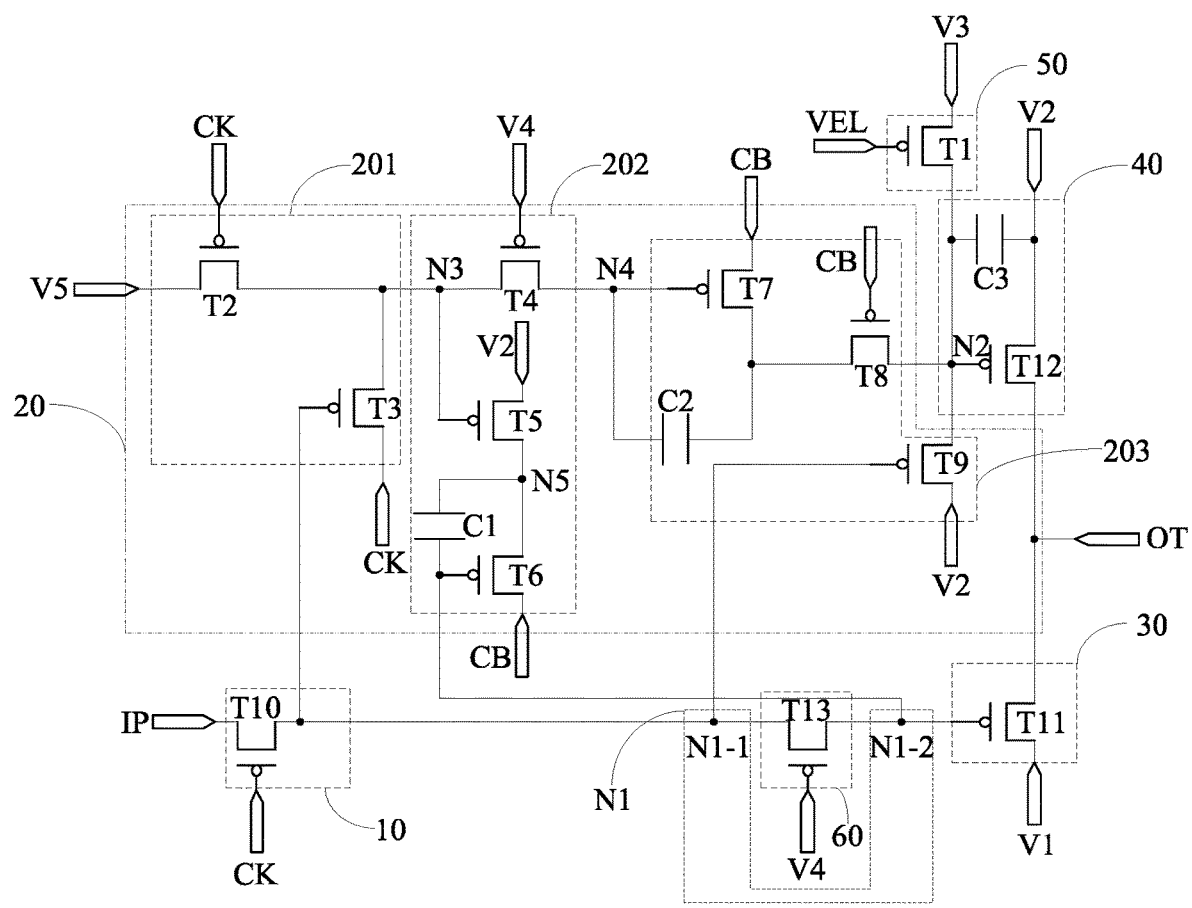
FIG. 1 is a schematic diagram of some structures of a shift register unit according to embodiments of the disclosure.

In order to make objectives, technical solutions and advantages of the embodiments of the disclosure clearer, the technical solutions of the embodiments of the disclosure are described clearly and completely below with reference to the drawings of the embodiments of the disclosure. Apparently, the described embodiments are some, not all, of the embodiments of the disclosure. The embodiments in the disclosure and the features in the embodiments may be combined with each other without conflict. Based on the described embodiments of the disclosure, all other embodiments obtained by those of ordinary skill in the art without inventive efforts fall within the protection scope of the disclosure.

Unless otherwise indicated, the technical or scientific terms used in the disclosure shall have the usual meanings understood by a person of ordinary skill in the art to which the disclosure belongs. The words "first", "second" and the like used in the disclosure do not indicate any order, quantity or importance, but are only used to distinguish different components. The word "including" or "containing" and the like, means that an element or item preceding the word covers an element or item listed after the word and the equivalent thereof, without excluding other elements or items. The word "connection" or "coupling" and the like is not restricted to physical or mechanical connection, but may include electrical connection, whether direct or indirect.

It should be noted that sizes and shapes of all figures in the drawings do not reflect a true scale and are only intended to illustrate the contents of the disclosure. Same or similar reference signs indicate same or similar elements or elements with the same or similar function throughout the disclosure.

Embodiments of the disclosure provide a shift register unit, as shown in FIG. 1, including: an input circuit 10 configured to, in response to a signal from a first clock signal terminal CK, provide a signal from the input signal terminal IP to a first node N1; a control circuit 20 configured to control a signal at a second node N2; a first output circuit 30 configured to, in response to a signal from the first node N1, provide a signal from a first reference voltage signal terminal V1 to an output signal terminal OT; a second output circuit 40 configured to, in response to a signal from the second node N2, provide a signal from a second reference voltage signal terminal V2 to the output signal terminal OT; and a noise reduction circuit 50 configured to, in response to a signal from the noise reduction signal terminal VEL, to provide a signal from a third reference voltage signal terminal V3 to the second node N2 to control the second output circuit 40 to stop outputting a signal.

In the embodiments of the disclosure, through the cooperation of the input circuit, control circuit, first output circuit, second output circuit, and noise reduction circuit, the output signal terminal can output a drive signal to a signal terminal coupled to the output signal terminal, achieving the driving process for the coupled signal terminal. Further, by the noise reduction circuit, the noise reduction circuit can control the second output circuit to stop outputting the signal in the second stage, so as to prevent the first output circuit and the second output circuit from being conducted simultaneously, which avoids a short circuit between the first reference voltage signal terminal and the second reference voltage signal terminal, reduces screen flickering, and improves display effect. Additionally, in cases of abnormal power loss or initialization, a short circuit between the first reference voltage signal terminal and the second reference voltage signal terminal can be avoided due to the noise reduction circuit, thereby reducing screen flickering and improving display effect.

In the embodiments of the disclosure, as shown in FIG. 1, the noise reduction circuit 50 includes a first transistor T1. A gate of the first transistor T1 is coupled to the noise reduction signal terminal VEL, a first electrode of the first transistor T1 is coupled to the third reference voltage signal terminal V3, and a second electrode of the first transistor T1 is coupled to the second node N2.

Exemplarily, the first transistor T1 can be turned on under the control of an effective level of the noise signal from the noise reduction signal terminal VEL and turned off under the control of an invalid level of the noise signal. Exemplarily, the first transistor T1 is a P-type transistor, the effective level of the noise signal is a low level, and the invalid level of the noise signal is a high level. Alternatively, the first transistor T1 is an N-type transistor, the effective level of the noise signal is the high level, and the invalid level of the noise signal is the low level.

In the embodiments of the disclosure, as shown in FIG. 1, the first node N1 includes: the first sub-node (N1-1) and the second sub-node (N1-2). The shift register unit further includes a conduction circuit 60. The first sub-node (N1-1) is coupled to the second sub-node (N1-2) via the conduction circuit 60. The conduction circuit 60 is configured to, in response to a signal from a fourth reference voltage signal terminal V4, conduct the first sub-node (N1-1) with the second sub-node (N1-2); the input circuit 10 is further configured to, in response to the signal from the first clock signal terminal CK, provide the signal from the input signal terminal IP to the first sub-node (N1-1); and the first output circuit 30 is further configured to, in response to the signal at the second sub-node (N1-2), provide the signal from the first reference voltage signal terminal V1 to the output signal terminal OT.

In the embodiments of the disclosure, as shown in FIG. 1, the control circuit 20 includes: a first control circuit 201, a second control circuit 202, and a third control circuit 203; the first control circuit 201 is configured to, in response to the signal from the first clock signal terminal CK, provide a signal from the fifth reference voltage signal terminal V5 to the third node N3, and in response to the signal at the first sub-node (N1-1), provide the signal from the first clock signal terminal CK to the third node N3; the second control circuit 202 is configured to control the signal at the second sub-node (N1-2) and the signal at the fourth node N4; the third control circuit 203 is configured to, in response to the signal at the fourth node N4 and the signal from the second clock signal terminal CB, provide the signal from the second clock signal terminal CB to the second node N2, and in response to the signal from the first sub-node (N1-1), provide the signal at the second reference voltage signal terminal V2 to the second node N2.

In the embodiments of the disclosure, as shown in FIG. 1, the first control circuit 201 includes: a second transistor T2 and a third transistor T3; a gate of the second transistor T2 is coupled to the first clock signal terminal CK, a first electrode of the second transistor T2 is coupled to the fifth reference voltage signal terminal V5, and a second electrode of the second transistor T2 is coupled to the third node N3; a gate of the third transistor T3 is coupled to the first sub-node (N1-1), a first electrode of the third transistor T3 is coupled to the third node N3, and a second electrode of the third transistor T3 is coupled to the first clock signal terminal CK.

Exemplarily, the second transistor T2 can be turned on under the control of an effective level of the first clock signal from the first clock signal terminal CK and turned off under the control of an invalid level of the first clock signal. Exemplarily, the second transistor T2 is an N-type transistor, the effective level of the first clock signal is the high level, and the invalid level of the first clock signal is the low level. Alternatively, the second transistor T2 is a P-type transistor, the effective level of the first clock signal is the low level, and the invalid level of the first clock signal is the high level.

Exemplarily, the third transistor T3 can be turned on under the control of an effective level of a signal at the first sub-node (N1-1) and turned off under the control of an invalid level of the signal at the first sub-node (N1-1). Exemplarily, the third transistor T3 is an N-type transistor, the effective level of the signal at the first sub-node (N1-1) is the high level, and the invalid level thereof is the low level. Alternatively, the third transistor T3 is a P-type transistor, the effective level of the signal at the first sub-node (N1-1) is the low level, and the invalid level thereof is the high level.

In the embodiments of the disclosure, as shown in FIG. 1, the second control circuit 202 is further configured to, in response to a signal from the fourth reference voltage signal terminal V4, provide a signal at the third node N3 to a fourth node N4, and in response to the signal at the third node N3, provide the signal from the second reference voltage signal terminal V2 to a fifth node N5, and in response to a signal at the second sub-node (N1-2), provide the signal from the second clock signal terminal CB to the fifth node N5.

In the embodiments of the disclosure, as shown in FIG. 1, the second control circuit 202 includes: a fourth transistor T4, a fifth transistor T5, a sixth transistor T6, and a first capacitor C1; a gate of the fourth transistor T4 is coupled to the fourth reference voltage signal terminal V4, a first electrode of the fourth transistor T4 is coupled to the third node N3, and a second electrode of the fourth transistor T4 is coupled to the fourth node N4; a gate of the fifth transistor T5 is coupled to the third node N3, a first electrode of the fifth transistor T5 is coupled to the second reference voltage signal terminal V2, and a second electrode of the fifth transistor T5 is coupled to the fifth node N5; a gate of the sixth transistor T6 is coupled to the second sub-node (N1-2), a first electrode of the sixth transistor T6 is coupled to the fifth node N5, and a second electrode of the sixth transistor T6 is coupled to the second clock signal terminal CB; a first electrode of the first capacitor C1 is coupled to the fifth node N5, and the second electrode of the first capacitor C1 is coupled to the second sub-node (N1-2).

Exemplarily, the fourth transistor T4 can be turned on under the control of an effective level of the fourth reference voltage signal from the fourth reference voltage signal terminal V4 and turned off under the control of an invalid level of the fourth reference voltage signal. Exemplarily, the fourth transistor T4 is an N-type transistor, the effective level of the fourth reference voltage signal is the high level, and the invalid level of the fourth reference voltage signal is the low level. Alternatively, the fourth transistor T4 is a P-type transistor, the effective level of the fourth reference voltage signal is the low level, and the invalid level of the fourth reference voltage signal is the high level.

Exemplarily, the fifth transistor T5 can be turned on under the control of the effective level of the signal at the third node N3 and turned off under the control of the invalid level of the signal at the third node N3. Exemplarily, the fifth transistor T5 is an N-type transistor, the effective level of the signal is the high level, and the invalid level of the signal is the low level. Alternatively, the fifth transistor T5 is a P-type transistor, the effective level of the signal is the low level, and the invalid level of the signal is the high level.

Exemplarily, the sixth transistor T6 can be turned on under the control of an effective level of the signal at the second sub-node (N1-2) and turned off under the control of an invalid level of the signal at the second sub-node (N1-2). Exemplarily, the sixth transistor T6 is an N-type transistor, the effective level of the signal is the high level, and the invalid level of the signal is the low level. Alternatively, the sixth transistor T6 is a P-type transistor, the effective level of the signal is the low level, and the invalid level of the signal is the high level.

In the embodiments of the disclosure, as shown in FIG. 1, the third control circuit 203 includes: a seventh transistor T7, an eighth transistor T8, a ninth transistor T9, and a second capacitor C2; a gate of the seventh transistor T7 is coupled to the fourth node N4, a first electrode of the seventh transistor T7 is coupled to the second clock signal terminal CB, a second electrode of the seventh transistor T7 is coupled to a first electrode of the eighth transistor T8; a gate of the eighth transistor T8 is coupled to the second clock signal terminal CB, and a second electrode of the eighth transistor T8 is coupled to the second node N2; a gate of the ninth transistor T9 is coupled to the first sub-node (N1-1), a first electrode of the ninth transistor T9 is coupled to the second node N2, and a second electrode of the ninth transistor T9 is coupled to the second reference voltage signal terminal V2; and a first electrode of the second capacitor C2 is coupled to the fourth node N4, and the second electrode of the second capacitor C2 is coupled to the first electrode of the eighth transistor T8.

Exemplarily, the seventh transistor T7 can be turned on under the control of an effective level of a signal at the fourth node N4 and turned off under the control of the invalid level of the signal at the fourth node N4. Exemplarily, the seventh transistor T7 is a P-type transistor, the effective level of the signal at the fourth node N4 is the low level, and the invalid level of the signal is the high level. Alternatively, the seventh transistor T7 is an N-type transistor, the effective level of the signal at the fourth node N4 is the high level, and the invalid level of the signal is the low level.

Exemplarily, the eighth transistor T8 can be turned on under the control of an effective level of the second clock signal from the second clock signal terminal CB and turned off under the control of an invalid level of the second clock signal. Exemplarily, the eighth transistor T8 is an N-type transistor, the effective level of the second clock signal is the high level, and the invalid level of the second clock signal is the low level. Alternatively, the eighth transistor T8 is a P-type transistor, the effective level of the second clock signal is the low level, and the invalid level of the second clock signal is the high level.

Exemplarily, the ninth transistor T9 can be turned on under the control of an effective level of the signal at the first sub-node (N1-1) and turned off under the control of an invalid level of the signal at the first sub-node (N1-1). Exemplarily, the ninth transistor T9 is an N-type transistor, the effective level of the signal at the first sub-node (N1-1) is the high level, and the invalid level of the signal is the low level. Alternatively, the ninth transistor T9 is a P-type transistor, the effective level of the signal at the first sub-node (N1-1) is the low level, and the invalid level of the signal is the high level.

In the embodiments of the disclosure, as shown in FIG. 1, the input circuit 10 includes a tenth transistor T10. A gate of the tenth transistor T10 is coupled to the first clock signal terminal CK, a first electrode of the tenth transistor T10 is coupled to the input signal terminal IP, and a second electrode of the tenth transistor T10 is coupled to the first sub-node (N1-1).

Exemplarily, the tenth transistor T10 can be turned on under the control of an effective level of the first clock signal from the first clock signal terminal CK and turned off under the control of an invalid level of the first clock signal. Exemplarily, the tenth transistor T10 is an N-type transistor, the effective level of the first clock signal is the high level, and the invalid level of the first clock signal is the low level. Alternatively, the tenth transistor T10 is a P-type transistor, the effective level of the first clock signal is the low level, and the invalid level of the first clock signal is the high level.

In the embodiments of the disclosure, as shown in FIG. 1, the first output circuit 30 includes an eleventh transistor T11. A gate of the eleventh transistor T11 is coupled to the second sub-node (N1-2), a first electrode of the eleventh transistor T11 is coupled to the output signal terminal OT, and a second electrode of the eleventh transistor T11 is coupled to the first reference voltage signal terminal V1.

Exemplarily, the eleventh transistor T11 can be turned on under the control of an effective level of the signal at the second sub-node (N1-2) and turned off under the control of the invalid level of the signal at the second sub-node (N1-2). Exemplarily, the eleventh transistor T11 is an N-type transistor, the effective level of the signal at the second sub-node (N1-2) is the high level, and the invalid level of the signal is the low level. Alternatively, the eleventh transistor T11 is a P-type transistor, the effective level of the signal at the second sub-node (N1-2) is the low level, and the invalid level of the signal is the high level.

In the embodiments of the disclosure, as shown in FIG. 1, the second output circuit 40 includes: a twelfth transistor T12 and a third capacitor C3; a gate of the twelfth transistor T12 is coupled to the second node N2, a first electrode of the twelfth transistor T12 is coupled to the second reference voltage signal terminal V2, and a second electrode of the twelfth transistor T12 is coupled to the output signal terminal OT; a first electrode of the third capacitor C3 is coupled to the second node N2, and a second electrode of the third capacitor C3 is coupled to the second reference voltage signal terminal V2.

Exemplarily, the twelfth transistor T12 can be turned on under the control of an effective level of the signal at the second node N2 and turned off under the control of an invalid level of the signal. Exemplarily, if the twelfth transistor T12 is an N-type transistor, the effective level of the signal at the second node N2 is the high level, and the invalid level of the signal is the low level. Alternatively, the twelfth transistor T12 is a P-type transistor, the effective level of the signal at the second node N2 is the low level, and the invalid level of the signal is the high level.

In the embodiments of the disclosure, as shown in FIG. 1, the conduction circuit 60 includes a thirteenth transistor T13. A gate of the thirteenth transistor T13 is coupled to the fourth reference voltage signal terminal V4, a first electrode of the thirteenth transistor T13 is coupled to the first sub-node (N1-1), and a second electrode of the thirteenth transistor T13 is coupled to the second sub-node (N1-2).

Exemplarily, the thirteenth transistor T13 can be turned on under the control of an effective level of the fourth reference voltage signal from the fourth reference voltage signal terminal V4 and turned off under the control of an invalid level of the fourth reference voltage signal. Exemplarily, if the thirteenth transistor T13 is an N-type transistor, the effective level of the fourth reference voltage signal is the high level, and the invalid level of the fourth reference voltage signal is the low level. Alternatively, the thirteenth transistor T13 is a P-type transistor, the effective level of the fourth reference voltage signal is the low level, and the invalid level of the fourth reference voltage signal is the high level.

In the embodiments of the disclosure, the second reference voltage signal terminal V2 and the third reference voltage signal terminal V3 are loaded with the same signal. Exemplarily, the second reference voltage signal terminal V2 and the third reference voltage signal terminal V3 can be the same one signal terminal, thereby reducing the number of signal lines and simplifying the wiring difficulty.

In specific implementations, based on a direction of signal flow, for each of the above transistors, the first electrode thereof serves as a source, and the second electrode thereof serves as a drain. Alternatively, the first electrode thereof serves as the drain, and the second electrode serves as the source, which no specific differentiation is made here.

It should be noted that the transistors mentioned in the embodiments of the disclosure can be thin-film transistors (TFT) or metal-oxide-semiconductor field-effect transistors (MOSFET), which are not limited herein.

In the embodiments of the disclosure, the above transistors can all be P-type transistors, the first reference voltage signal terminal V1 can be loaded with a constant first reference voltage, and the first reference voltage is generally negative in value. Further, the second reference voltage signal terminal V2 can be loaded with a constant second reference voltage, and the second reference voltage can generally be positive in value.

In the embodiments of the disclosure, the fourth reference voltage signal terminal V4 can be loaded with a constant fourth reference voltage, and the fourth reference voltage is generally negative in value. Exemplarily, a value of the first reference voltage can be set smaller than a value of the fourth reference voltage, so that the shift register unit provided in the embodiments of the disclosure can output a more stable signal while preventing screen flickering.

In the embodiments of the disclosure, the fifth reference voltage signal terminal V5 can be loaded with a constant fifth reference voltage. Exemplarily, a value of the fifth reference voltage can be made smaller than the value of the fourth reference voltage, so that the shift register unit provided in the embodiments of the disclosure can output a more stable signal while preventing screen flickering.

In the embodiments of the disclosure, the value of the fifth reference voltage can be similar or identical to the value of the first reference voltage. Of course, they can be different.

In practical applications, the specific values of the above-mentioned voltages can be designed and determined based on the actual application environment, which are not limited herein. Of course, the above-mentioned transistors can all be N-type transistors, which is not limited either.

Embodiments of the disclosure provide a driving method for the above shift register unit, including the following. In a noise reduction stage: in response to the signal at the first node, the first output circuit provides the signal from the first reference voltage signal terminal to the output signal terminal; and in response to the signal from the noise reduction signal terminal, the noise reduction circuit provides the signal from the third reference voltage signal terminal to the second node to control the second output circuit to stop outputting the signal.

Figure 2:
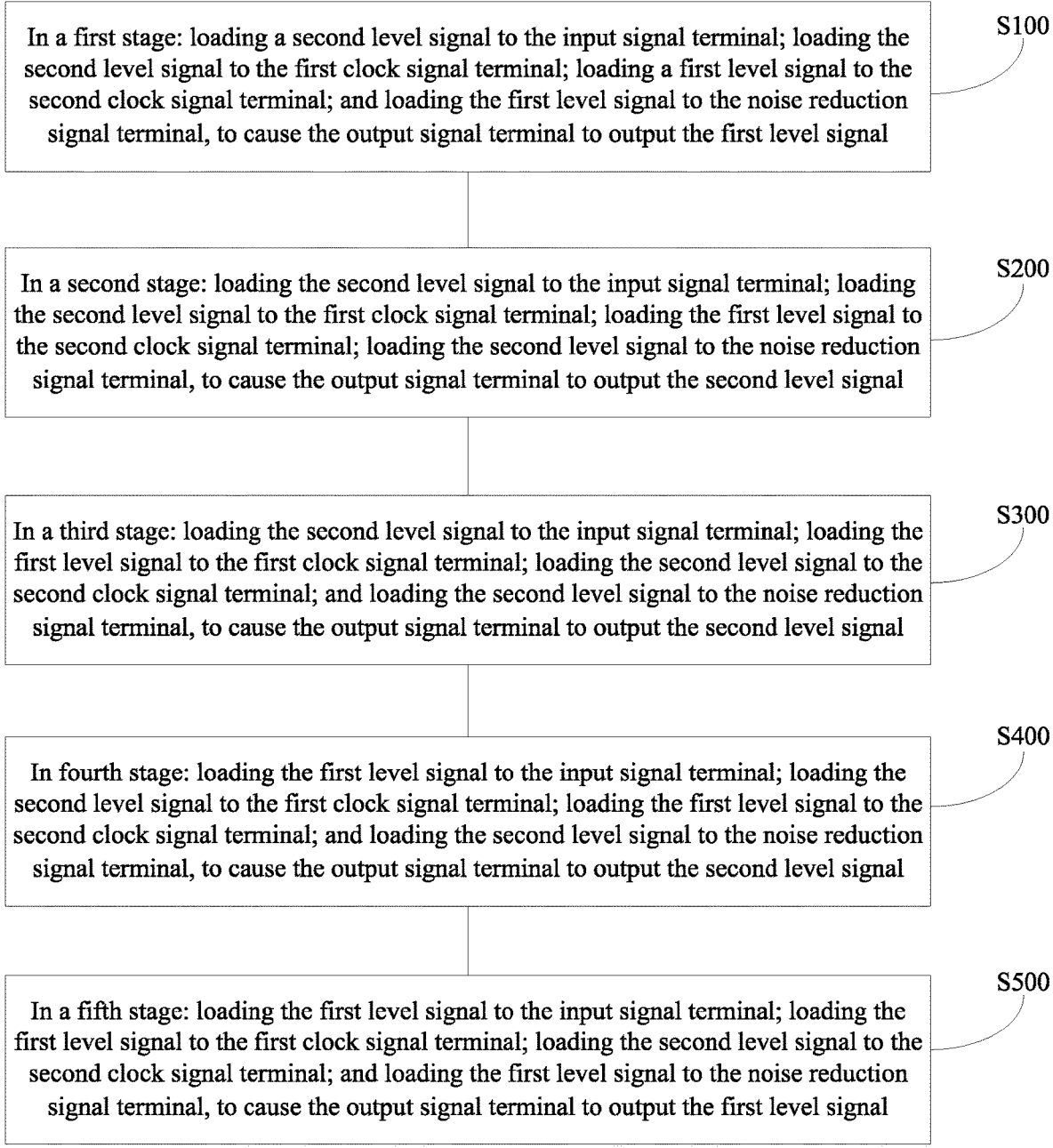
FIG. 2 is a schematic flow diagram of a driving method of a shift register unit according to embodiments of the disclosure.

As shown in FIG. 2, embodiments of the disclosure provide a driving method for the above shift register unit, including the following. S100, in a first stage: a second level signal is loaded to the input signal terminal; the second level signal is loaded to the first clock signal terminal; a first level signal is loaded to the second clock signal terminal: and the first level signal is loaded to the noise reduction signal terminal, to cause the output signal terminal to output the first level signal. S200, in a second stage: the second level signal is loaded to the input signal terminal; the second level signal is loaded to the first clock signal terminal; the first level signal is loaded to the second clock signal terminal; and the second level signal is loaded to the noise reduction signal terminal, to cause the output signal terminal to output the second level signal. S300, in a third stage: the second level signal is loaded to the input signal terminal; the first level signal is loaded to the first clock signal terminal; and the second level signal is loaded to the second clock signal terminal; the second level signal is loaded to the noise reduction signal terminal, to cause the output signal terminal to output the second level signal . S400, in a fourth stage: the first level signal is loaded to the input signal terminal; the second level signal is loaded to the first clock signal terminal; the first level signal is loaded to the second clock signal terminal; and the second level signal is loaded to the noise reduction signal terminal, to cause the output signal terminal to output the second level signal . S500, in a fifth stage: the first level signal is loaded to the input signal terminal; the first level signal is loaded to the first clock signal terminal; the second level signal is loaded to the second clock signal terminal; and the first level signal is loaded to the noise reduction signal terminal, to cause the output signal terminal to output the first level signal .

For example, for a shift register unit with all transistors being P-type transistors, the first level signal is a low-level signal, and the second level signal is a high-level signal. Alternatively, for a shift register unit with all transistors being N-type transistors, the first level signal is a high-level signal, and the second level signal is a low-level signal.

The noise reduction stage can include: the second stage, the third stage, and the fourth stage.

Certainly, the implementation in the noise reduction stage can be determined based on the requirements of the actual application in practical use, which is not limited herein.

Figure 3:
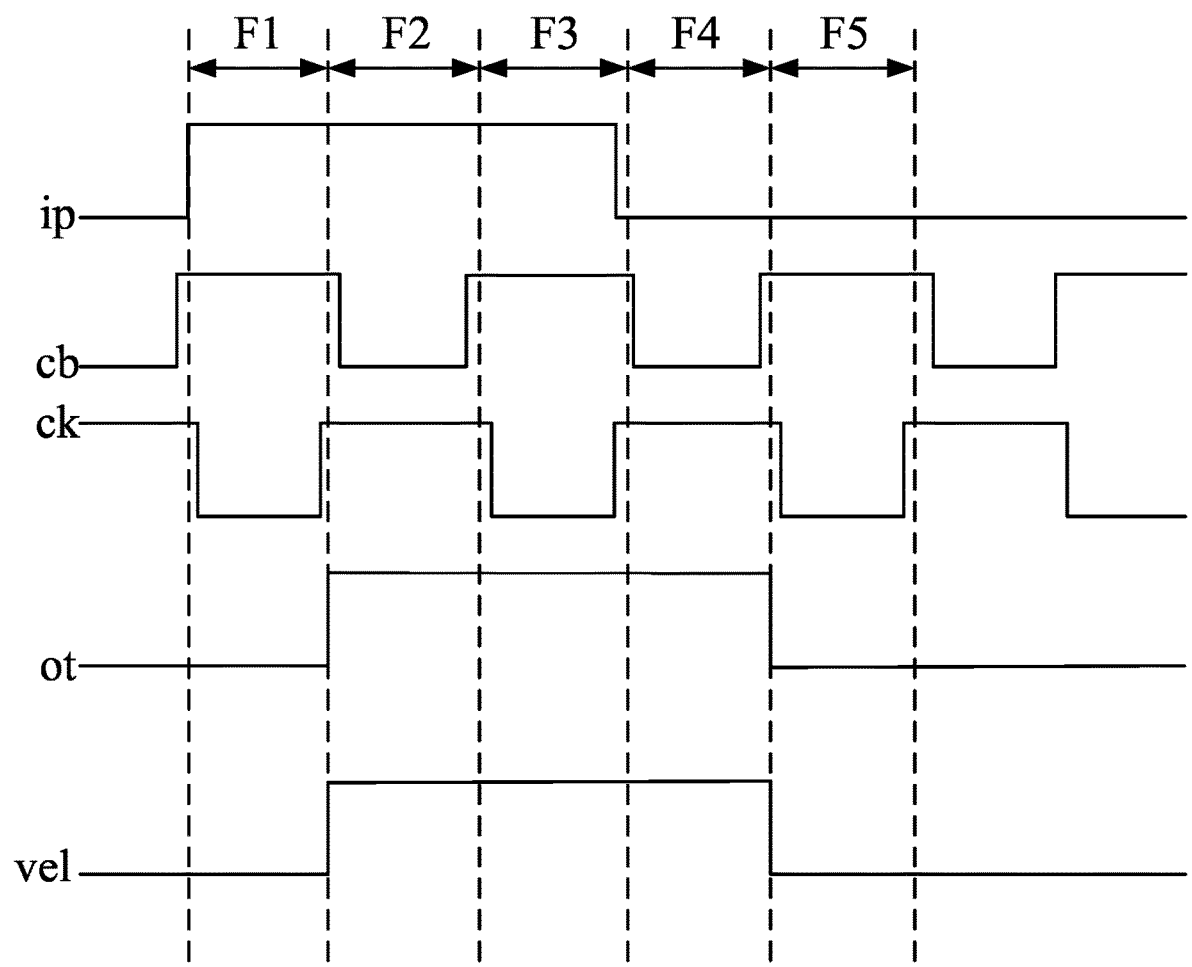
FIG. 3 is a schematic timing chart of some signals.

The following illustrates a working process of the pixel driving circuit provided in the embodiments of the disclosure, by taking the shift register unit shown in FIG. 1 as an example, and combining the signal timing chart shown in FIG. 3.

Here, "ip" represents a input signal at the input signal terminal IP, "ck" represents the first clock signal from the first clock signal terminal CK, "cb" represents the second clock signal from the second clock signal terminal CB, "ot" represents the output signal at the output signal terminal OT, and "vel" represents the noise reduction signal at the VEL terminal.

Since the gate of the fourth transistor T4 and the gate of the thirteenth transistor T13 are both coupled to the fourth reference voltage signal terminal V4, and a signal of the fourth reference voltage signal terminal V4 is a low-level signal, the fourth transistor T4 and the thirteenth transistor T13 are in a constant on state. For case of description, the states of the fourth transistor T4 and the thirteenth transistor T13 at any moment are not analyzed in detail in the following description.

In first Stage F1: the input signal "ip" provides the high level, the second clock signal "cb" provides the high level, the first clock signal "ck" provides the low level, and the noise reduction signal "vel" provides the low level. As a result, the tenth transistor T10 is turned on, and the high level of the input signal "ip" is provided to the first sub-node (N1-1) and the second sub-node (N1-2). The third transistor T3, the sixth transistor T6, the ninth transistor T9, and the eleventh transistor T11 are all turned off. Additionally, the second transistor T2 is turned on, the third node N3 and the fourth node N4 are both at the low level, the seventh transistor T7 is turned on, and the eighth transistor T8 is turned off. The first transistor T1 is turned on, the second node N2 is at the high level, and the twelfth transistor T12 is turned off. Therefore, the signal output from the output signal terminal OT is maintained at the low level.

In second Stage F2: the input signal "ip" provides the high level, the second clock signal "cb" provides the low level, the first clock signal "ck" provides the high level, and the noise reduction signal "vel" provides the high level. The tenth transistor T10 is turned off, the first sub-node (N1-1) and the second sub-node (N1-2) remain at the high level, and the third transistor T3, the sixth transistor T6, the ninth transistor T9, and the eleventh transistor T11 are all turned off. The first transistor T1 is turned off, the second transistor T2 is turned off, and the third node N3 and the fourth node N4 remain at the low level. The seventh transistor T7 is turned on, the eighth transistor T8 is turned on, the second node N2 is at the low level, and the twelfth transistor T12 is turned on. Therefore, the signal output from the output signal terminal OT is of the high level.

In third Stage F3: the input signal "ip" provides the high level, the second clock signal "cb" provides the high level, the first clock signal "ck" provides the low level, and the noise reduction signal "vel" provides the high level. The tenth transistor T10 is turned on, and the high level of the input signal "ip" is provided to the first sub-node (N1-1) and the second sub-node (N1-2). The third transistor T3, the sixth transistor T6, the ninth transistor T9, and the eleventh transistor T11 are all turned off. The first transistor T1 is turned off, the second transistor T2 is turned on, and the third node N3 and the fourth node N4 remain at the low level. The seventh transistor T7 is turned on, the eighth transistor T8 is turned off, the second node N2 remains at the low level, and the twelfth transistor T12 is turned on. Therefore, the signal output from the output signal terminal OT is of the high level.

In fourth Stage F4: the input signal "ip" provides the low level, the second clock signal "cb" provides the low level, the first clock signal "ck" provides the high level, and the noise reduction signal "vel" provides the high level. The tenth transistor T10 is turned off, and the first sub-node (N1-1) and the second sub-node (N1-2) remain at the high level. The third transistor T3, the sixth transistor T6, the ninth transistor T9, and the eleventh transistor T11 are all turned off. The first transistor T1 is turned off, the second transistor T2 is turned off, and the third node N3 and the fourth node N4 remain at the low level. The seventh transistor T7 is turned on, the eighth transistor T8 is turned on, the second node N2 is at the low level, and the twelfth transistor T12 is turned on. Therefore, the signal output from the output signal terminal OT is of the high level.

In fifth Stage F5: the input signal "ip" provides the low level, the second clock signal "cb" provides the high level, the first clock signal "ck" provides the low level, and the noise reduction signal "vel" provides the low level. The tenth transistor T10 is turned on, and the low level of the input signal "ip" is provided to the first sub-node (N1-1) and the second sub-node (N1-2). The third transistor T3, the sixth transistor T6, the ninth transistor T9, and the eleventh transistor T11 are all turned on. The first transistor T1 is turned off, the second transistor T2 is turned on, and the third node N3 and the fourth node N4 remain at the low level. The seventh transistor T7 is turned on, the eighth transistor T8 is turned off, the second node N2 is at the high level, and the twelfth transistor T12 is turned off. Therefore, the signal output from the output signal terminal OT is of the low level.

Figure 4:
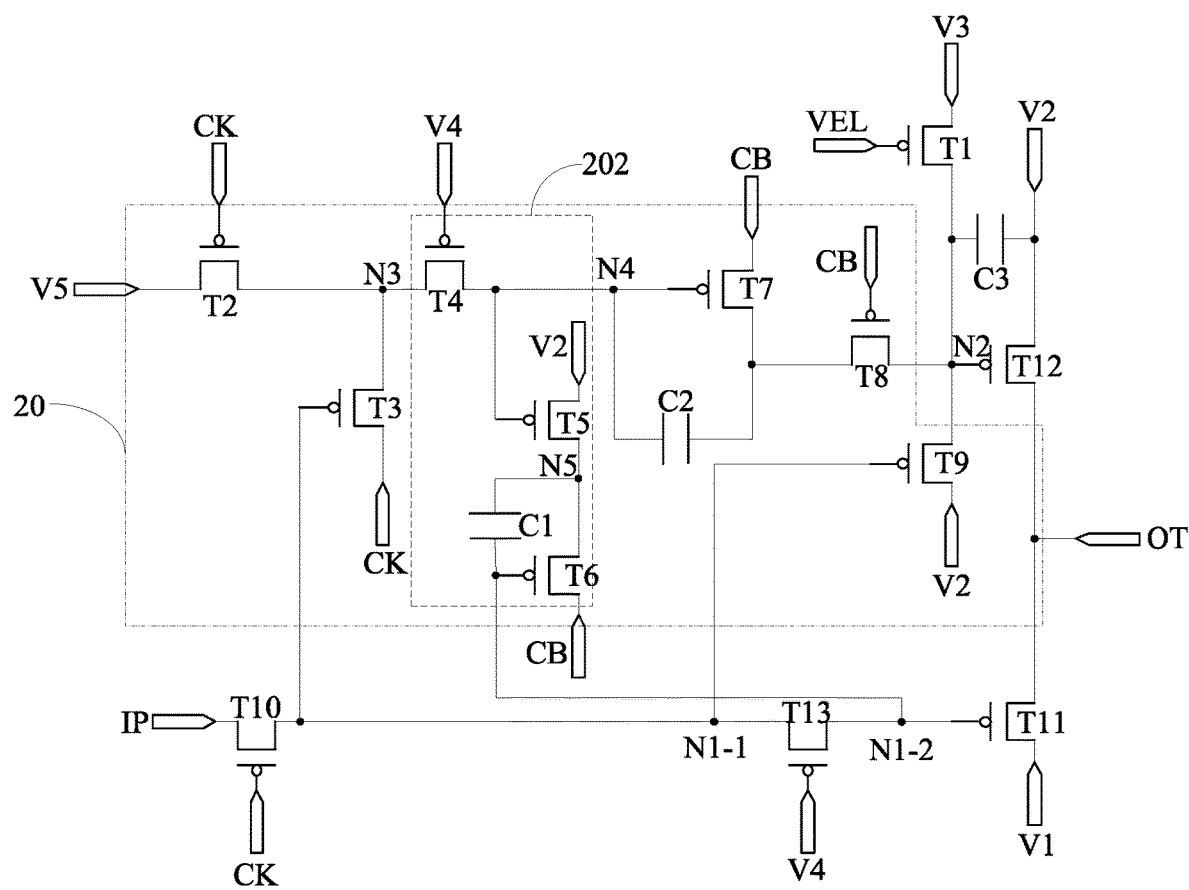
FIG. 4 is a schematic diagram of some other structures of a shift register unit according to embodiments of the disclosure.

Embodiments of the disclosure further provides a schematic diagram of another shift register unit, as shown in FIG. 4, which is a variation based on the implementation in the above embodiments. Only differences between this embodiment and the above embodiments will be explained below, while the generally similar parts will not be repeated here.

In the embodiments of the disclosure, as shown in FIG. 4, the second control circuit 202 is further configured to, in response to a signal from the fourth reference voltage signal terminal V4, provide the signal from the third node N3 to the fourth node N4; in response to the signal at the fourth node N4, provide the signal from the second reference voltage signal terminal V2 to the fifth node N5; and in response to the signal from the second sub-node (N1-2), provide the signal from the second clock signal terminal CB to the fifth node N5.

In the embodiments of the disclosure, as shown in FIG. 4, the second control circuit 202 includes: a fourth transistor T4, a fifth transistor T5, a sixth transistor T6, and a first capacitor C1; a gate of the fourth transistor T4 is coupled to the fourth reference voltage signal terminal V4, a first electrode of the fourth transistor T4 is coupled to the third node N3, and the second electrode of the fourth transistor T4 is coupled to the fourth node N4 Epa gate of the fifth transistor T5 is coupled to the fourth node N4, a first electrode of the fifth transistor T5 is coupled to the second reference voltage signal terminal V2, and a second electrode of the fifth transistor T5 is coupled to the fifth node N5 ⁅SEP⁆ a gate of the sixth transistor T6 is coupled to the second sub-node (N1-2), a first electrode of the sixth transistor T6 is coupled to the fifth node N5, and the second electrode of the sixth transistor T6 is coupled to the second clock signal terminal CB; and a first electrode of the first capacitor C1 is coupled to the fifth node N5, and a second electrode of the first capacitor C1 is coupled to the second sub-node (N1-2) ⁅SEP⁆.

Based on the above embodiments, the fifth transistor T5 is controlled to be turned on or off by the signal at the fourth node N4. The remaining operation process can be referred to the description of the above embodiments, which will not be repeated here.

Figure 5:
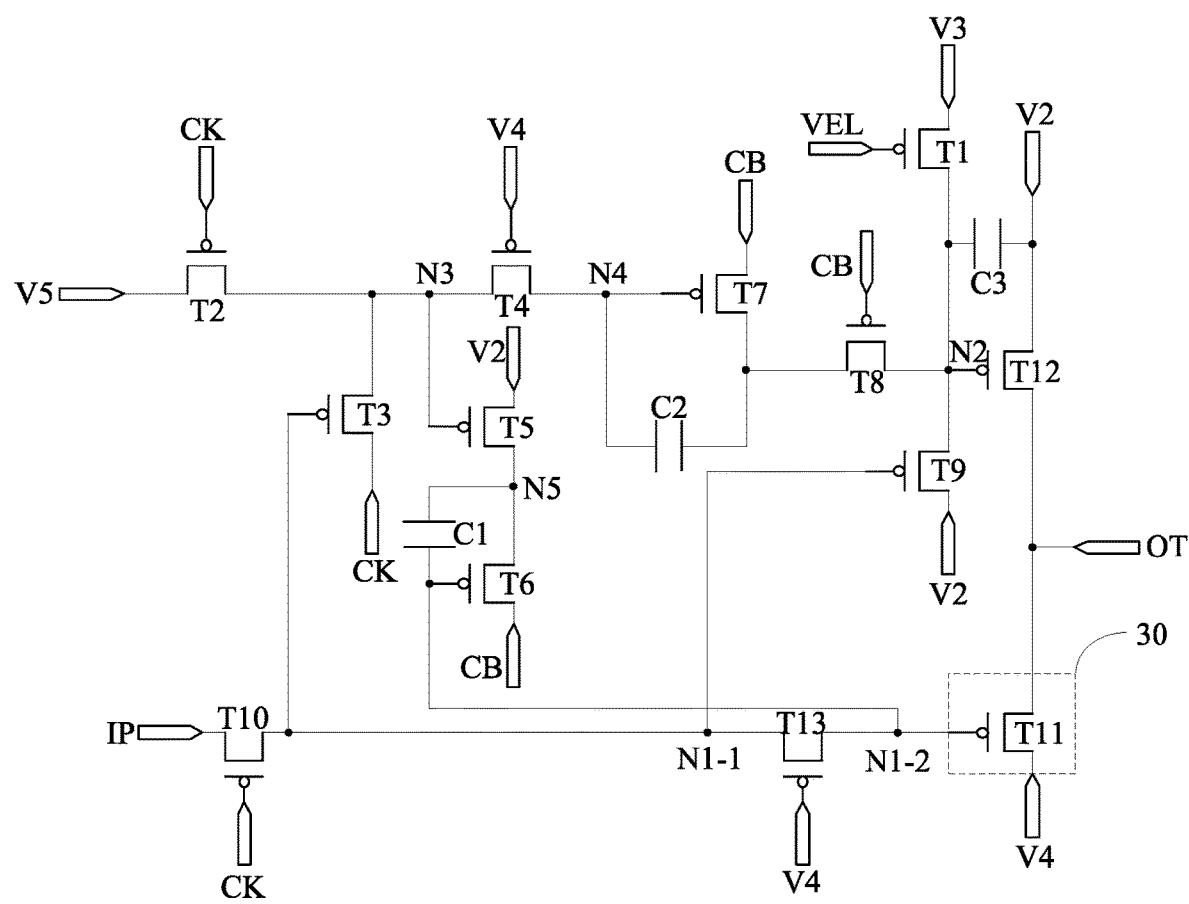
FIG. 5 is a schematic diagram of yet some other structures of a shift register unit according to embodiments of the disclosure.

Embodiments of the disclosure also provide a schematic diagram of another shift register unit, as shown in FIG. 5, which is a variation based on the implementation in the above embodiments. The differences between this embodiment and the previous embodiments will be explained below, while the generally similar parts will not be repeated here.

In the embodiments of the disclosure, a value of the first reference voltage may be equal to a value of the fourth reference voltage. For example, the first reference voltage signal terminal V1 and the fourth reference voltage signal terminal V4 can be the same one signal terminal, thereby reducing the number of signal lines and simplifying wiring difficulties. Exemplarily, as shown in FIG. 5, a gate of the eleventh transistor T11 is coupled to the second sub-node (N1-2), a first electrode of the eleventh transistor T11 is coupled to the output signal terminal OT, and a second electrode of the eleventh transistor T11 is coupled to the fourth reference voltage signal terminal V4.

Based on the above embodiments, when the eleventh transistor T11 is turned on, the signal from the fourth reference voltage signal terminal V4 is provided to the output signal terminal OT. The remaining operation process can be referred to the description of the above embodiments, which will not be repeated here.

Figure 6:
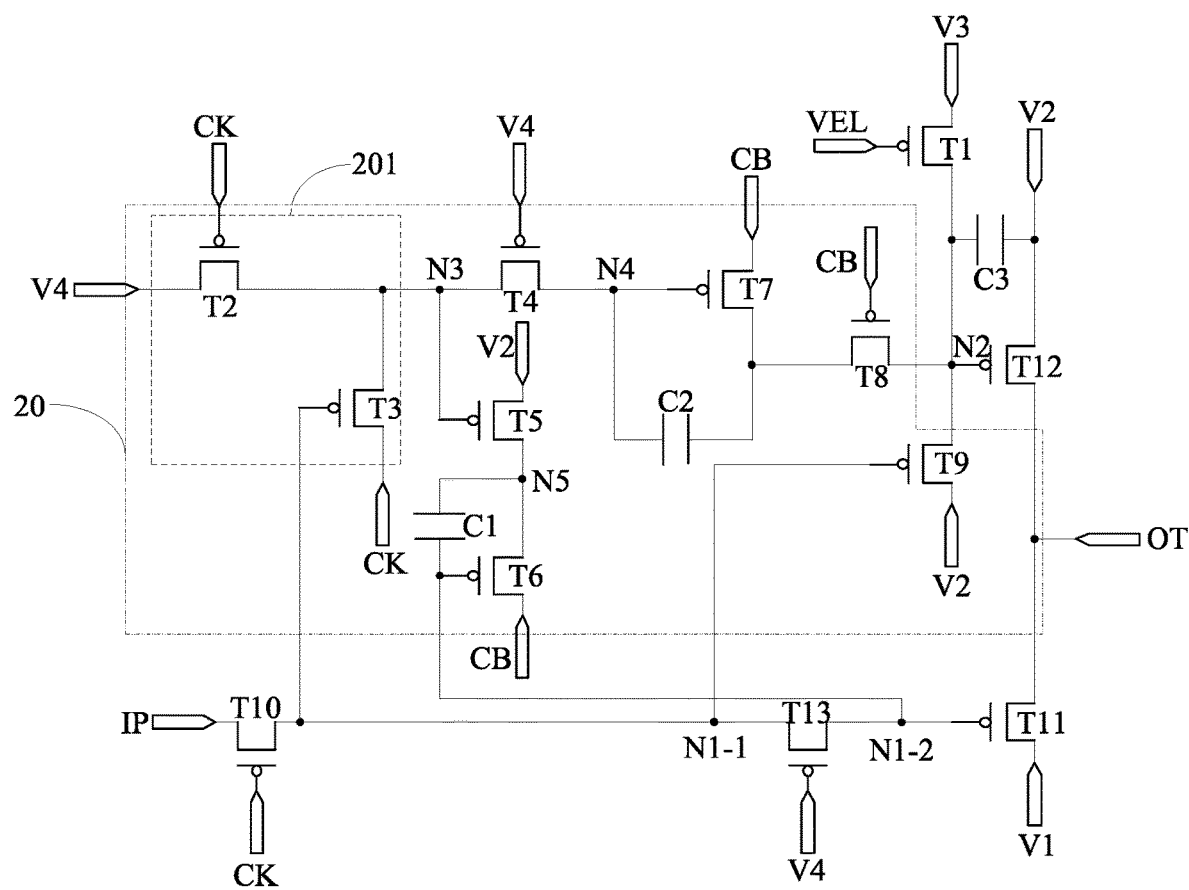
FIG. 6 is a schematic diagram of yet some other structures of a shift register unit according to embodiments of the disclosure.

Embodiments of the disclosure also provide a schematic diagram of another shift register unit, as shown in FIG. 6, which is a variation based on the implementation in the above embodiments. The differences between this embodiment and the previous embodiments will be explained below, while the generally similar parts will not be repeated here.

In the embodiments of the disclosure, a value of the fifth reference voltage may be equal to a value of the fourth reference voltage. For example, the fifth reference voltage signal terminal V5 and the fourth reference voltage signal terminal V4 can be the same one signal terminal, thereby reducing the number of signal lines and simplifying wiring difficulties. For example, as shown in FIG. 6, a gate of the second transistor T2 is coupled to the first clock signal terminal CK, a first electrode of the second transistor T2 is coupled to the fourth reference voltage signal terminal V4, and a second electrode of the second transistor T2 is coupled to the third node N3.

Based on the above embodiments, when the second transistor T2 is turned on, the signal from the fourth reference voltage signal terminal V4 is provided to the third node N3. The remaining operation process can be referred to the description of the above embodiments, which will not be repeated here.

Figure 7:
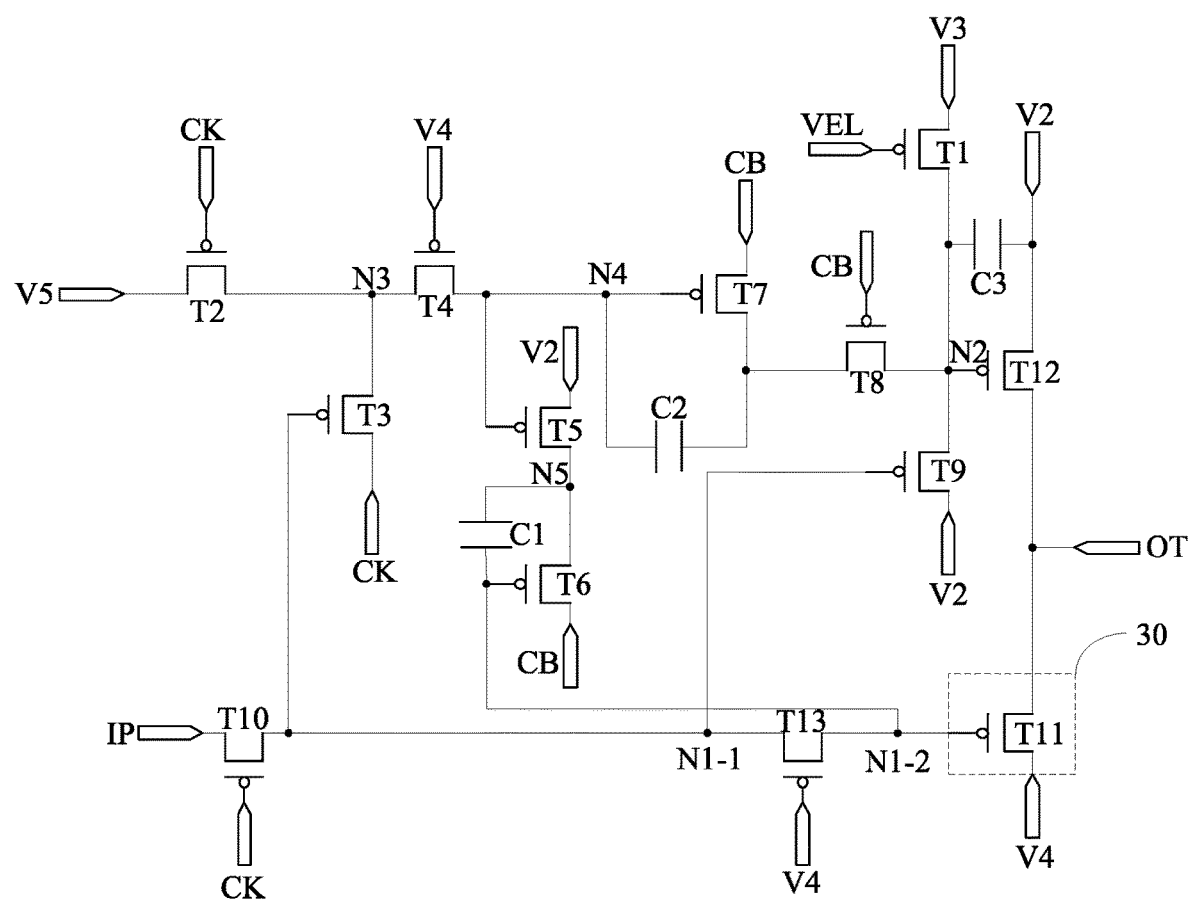
FIG. 7 is a schematic diagram of yet some other structures of a shift register unit according to embodiments of the disclosure.

Embodiments of the disclosure also provide a schematic diagram of another shift register unit, as shown in FIG. 7, which is a variation based on the implementation in the above embodiments. The differences between this embodiment and the previous embodiments will be explained below, while the generally similar parts will not be repeated here.

In the embodiments of the disclosure, a value of the first reference voltage may be equal to a value of the fourth reference voltage. For example, the first reference voltage signal terminal V1 and the fourth reference voltage signal terminal V4 can be the same one signal terminal, thereby reducing the number of signal lines and simplifying wiring difficulties. For example, as shown in FIG. 7, a gate of the eleventh transistor T11 is coupled to the second sub-node (N1-2), a first electrode of the eleventh transistor T11 is coupled to the output signal terminal OT, and a second electrode of the eleventh transistor T11 is coupled to the fourth reference voltage signal terminal V4.

Based on the above embodiments, when the eleventh transistor T11 is turned on, the signal from the fourth reference voltage signal terminal V4 is provided to the output signal terminal OT. The remaining operation process can be referred to the description of the above embodiments, which will not be repeated here.

Figure 8:
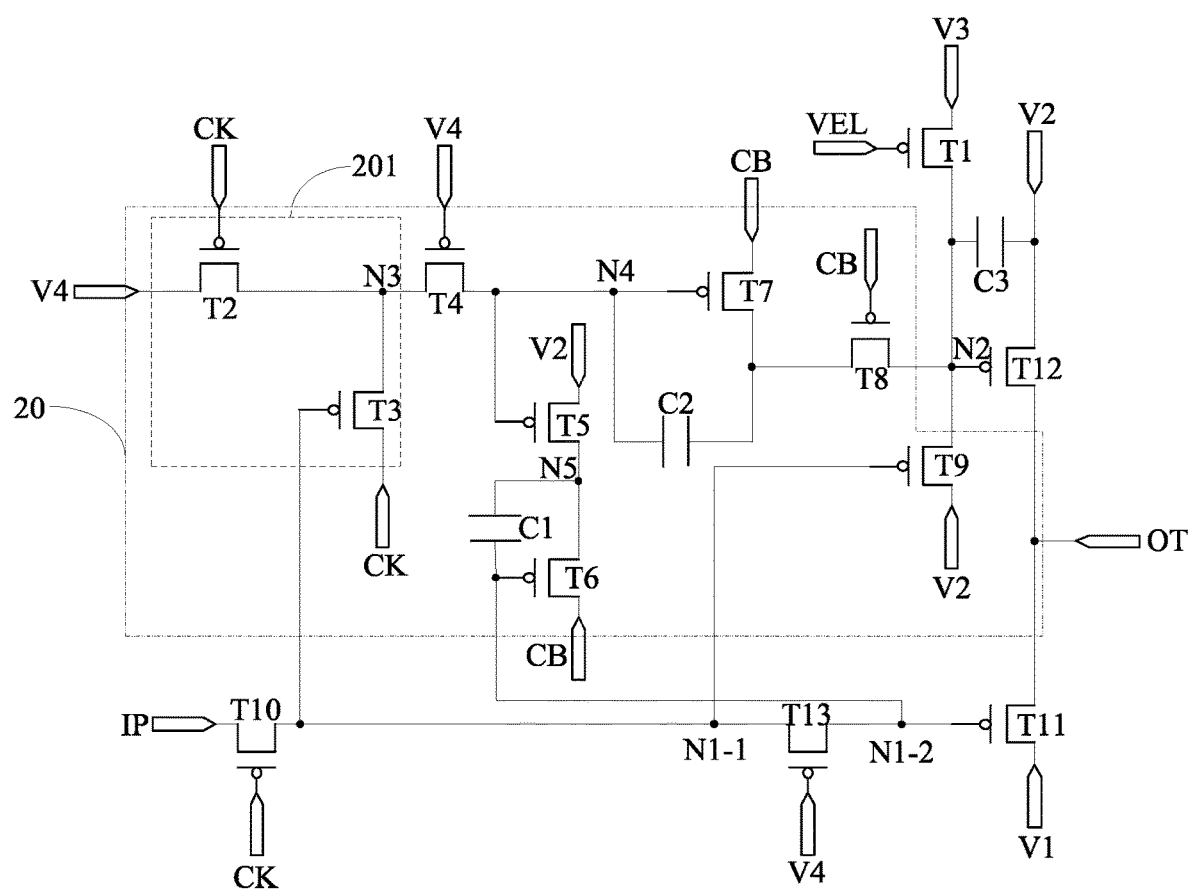
FIG. 8 is a schematic diagram of yet some other structures of a shift register unit according to embodiments of the disclosure.

Embodiments of the disclosure also provide a schematic diagram of another shift register unit, as shown in FIG. 8, which is a variation based on the implementation in the above embodiments. The differences between this embodiment and the previous embodiments will be explained below, while the generally similar parts will not be repeated here.

In the embodiments of the disclosure, a value of the fifth reference voltage may be equal to a value of the fourth reference voltage. For example, the fifth reference voltage signal terminal V5 and the fourth reference voltage signal terminal V4 can be the same one signal terminal, thereby reducing the number of signal lines and simplifying wiring difficulties. For example, as shown in FIG. 8, a gate of the second transistor T2 is coupled to the first clock signal terminal CK, a first electrode of the second transistor T2 is coupled to the fourth reference voltage signal terminal V4, and a second electrode of the second transistor T2 is coupled to the third node N3.

Based on the above embodiments, when the second transistor T2 is turned on, the signal from the fourth reference voltage signal terminal V4 is provided to the third node N3. The remaining operation process can be referred to the description of the above embodiments, which will not be repeated here.

Embodiments of the disclosure further provide a shift register unit, including: an input circuit (e.g., the input circuit 10, as mentioned above), coupled to an input signal terminal (e.g., the input signal terminal IP, as mentioned above) and a first node (e.g., the first node N1, as mentioned above), and configured to provide a signal from the input signal terminal to the first node; a control circuit (e.g., the control circuit 20, as mentioned above), coupled to a second node (e.g., N2) and configured to control the second node; a first output transistor (e.g., the twelfth transistor T12, as mentioned above), where a gate of the first output transistor is coupled to the second node, a first electrode of the first output transistor is coupled to a second reference voltage signal terminal (e.g., the second reference voltage signal terminal V2, as mentioned above), and a second electrode of the first output transistor is coupled to an output signal terminal (e.g., the terminal OUT, as mentioned above); and the first output transistor is configured to, in response to the signal at the second node, provide a signal from the second reference voltage signal terminal to the output signal terminal; a noise reduction transistor (e.g., the first transistor T1, as mentioned above), where a gate of the noise reduction transistor is coupled to a noise reduction signal terminal (e.g., the terminal VEL, as mentioned above), a first electrode of the noise reduction transistor is coupled to a third reference voltage signal terminal (e.g., the terminal V3, as mentioned above), and a second electrode of the noise reduction transistor is coupled to the second node, and the noise reduction transistor is configured to, in response to the signal from the noise reduction signal terminal, provide a signal from the third reference voltage signal terminal to the second node.

Here, a working process of the shift register unit of the embodiments of the disclosure can refer to the above description, which will not be repeated here.

In the embodiments of the disclosure, the shift register unit further includes a third capacitor (e.g., the third capacitor C3, as mentioned above). A first electrode of the third capacitor is coupled to the second reference voltage signal terminal, and a second electrode of the third capacitor is coupled to the second electrode of the noise reduction transistor.

In the embodiments of the disclosure, the shift register further includes a second output transistor (e.g., the eleventh transistor T11). A gate of the second output transistor is coupled to the first node, a first electrode of the second output transistor is coupled to the first reference voltage signal terminal (e.g., the first reference voltage signal terminal V1, as mentioned above), and a second electrode of the second output transistor is coupled to the output signal terminal. The second output transistor is configured to, in response to the signal at the first node, provide the signal from the first reference voltage signal terminal to the output signal terminal.

In the embodiments of the disclosure, the second reference voltage signal terminal (e.g., the second reference voltage signal terminal V2, as mentioned above) and the third reference voltage signal terminal (e.g., the third reference voltage signal terminal V3, as mentioned above) are the same one signal terminal.

Embodiments of the disclosure provide a drive control circuit including multiple cascaded shift register units. An input signal terminal of a first stage of shift register unit is coupled to a frame trigger signal terminal. In every two stages of shift register units that are adjacent to each other, an input signal terminal of a next stage of shift register unit is coupled to an output signal terminal of a shift register unit preceding the next stage of shift register unit.

Figure 9:
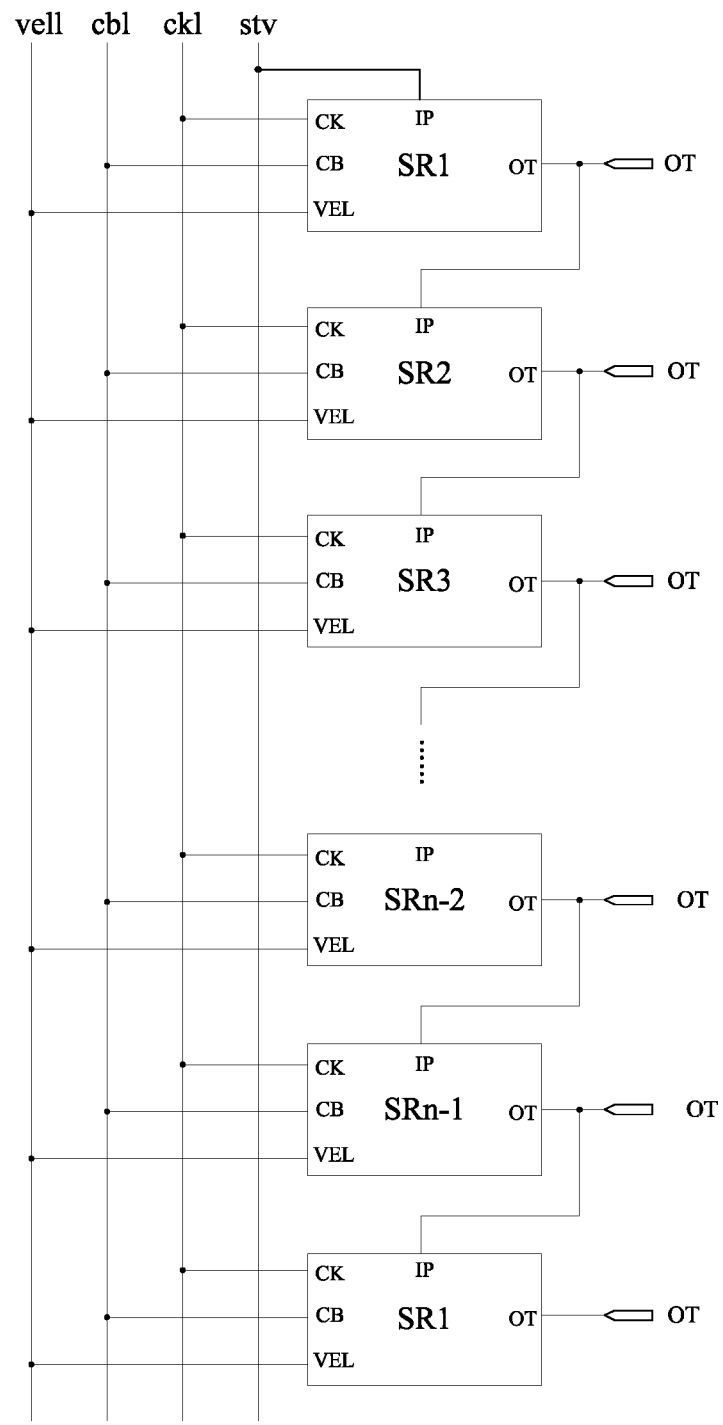
FIG. 9 is a schematic diagram of some structures of a drive control circuit according to embodiments of the disclosure.

For example, as shown in FIG. 9, the drive control circuit includes multiple cascaded shift register units SR1, SR2, SR3, . . . , SRn-2, SRn-1, and SRn; where n is a natural number. The value of n depends on the actual design needs. Each shift register unit can be the shift register unit shown in any of FIG. 1 or FIG. 4 to FIG. 8. Each shift register unit includes an input signal terminal IP, an output signal terminal OT, a noise reduction signal terminal VEL, a first clock signal terminal CK, and a second clock signal terminal CB. The respective terminals are provided with signals indicated in the timing chart shown in FIG. 3. The input signal terminal IP of the shift register unit SR1 is coupled to the frame trigger signal terminal stv; and in each of subsequent stages of shift register units, the output signal terminal OT of the previous shift register unit is coupled to the input signal terminal IP of the next stage shift register unit. That is, the signal output from the output signal terminal of the shift register unit SR1 can be used as the input signal for the input signal terminal of the shift register unit SR2, the signal output from the output signal terminal of the shift register unit SR2 can be used as the input signal for the input signal terminal of the shift register unit SR3, . . . the signal output from the output signal terminal of the shift register unit SRn-1 can be used as the input signal for the input signal terminal of the shift register unit SRn, until there is no next stage shift register unit. The noise reduction signal terminal VEL is provided with a noise reduction signal, "vel", the first clock signal terminal CK is provided with a first clock signal "ckl", and the second clock signal terminal CB is provided with a second clock signal "cbl". The timing of the gate drive device shown in FIG. 9 can be inferred based on the connection relationship of each shift register unit and the timing shown in FIG. 3, which will not be described here.

Based on the same inventive concept, embodiments of the disclosure provide a display apparatus, including a plurality of pixel units, a plurality of signal lines, and the drive control circuit as mentioned above. The output signal terminal of one shift register unit in the drive control circuit is coupled to at least one signal line among the plurality of signal lines. The implementation of the display apparatus solving the problem is similar to the drive control circuit described above, so the implementation of the display apparatus can refer to the implementation of the drive control circuit described above, and the repetitive parts will not be described here.

In specific implementations, the display apparatus in the embodiments of the disclosure can be: a mobile phone, tablet, TV, monitor, laptop, digital photo frame, navigation system, or any product or component with display functionality. Other essential components of the display apparatus are well understood by those skilled in the art, will not be repeated here, nor should they be considered as limiting the disclosure.

In specific implementations, the display apparatus may include multiple pixel units, multiple gate lines and multiple data lines. Each pixel unit may include multiple sub-pixels, such as red sub-pixels, green sub-pixels, and blue sub-pixels. The display apparatus provided in the embodiments of the disclosure can be an organic light-emitting display apparatus or a liquid crystal display (LCD) apparatus, which is not limited here.

In the embodiments of the disclosure, the multiple gate lines are also provided with the drive control circuit. One of the gate lines is coupled to the output signal terminal of one shift register unit in the drive control circuit. For example, when the display apparatus is the LCD apparatus, the thin-film transistor(s) (TFT) in the sub-pixel can be coupled to the gate line, and the drive control circuit can serve as the gate drive circuit. The gate drive circuit is coupled to the gate lines, and is configured to provide gate signals to gates of the TFTs in the sub-pixels. It should be noted that, the TFT(s) in the sub-pixel can be an N-type transistor or a P-type transistor, which is not limited here.

In some implementations of the embodiments of the disclosure, when the display apparatus is an organic light-emitting display apparatus, the display apparatus may further include multiple emission control signal lines. The multiple emission control signal lines are provided with a drive control circuit. One of emission control signal lines is coupled to the output signal terminal of one shift register unit in the drive control circuit. Also, multiple gate lines are also provided with a drive control circuit, and one of gate lines is coupled to the output signal terminal of one shift register unit in the drive control circuit. For example, in an organic light-emitting display apparatus, a plurality of organic light emitting diodes (OLEDs) and pixel circuits connected with the respective OLEDs are generally provided. The pixel circuit generally includes an emission control transistor(s) for controlling the OLED to emit light and a scanning control transistor(s) configured for controlling data signal input.

In some specific implementations, the emission control transistor can be coupled to an emission control signal line, and the scanning control transistor can be coupled to a gate line. The organic light-emitting display apparatus can include the above drive control circuit according to the embodiments of the disclosure. The drive control circuit can serve as an emission drive circuit, and the emission drive circuit is coupled to emission control transistors and is configured to provide emission control signals to the emission control transistors. Alternatively, the drive control circuit can serve as a gate drive circuit, and the gate drive circuit is coupled to the gate lines and is configured to provide gate signals to the scanning control transistors.

Of course, in the organic light-emitting display apparatus provided in the embodiments of the disclosure, two drive control circuits according to embodiments of the disclosure can be provided. One of the two drive control circuits can serve as an emission drive circuit, is coupled to emission control transistors and configured to provide emission control signals to the emission control transistors. The other one of the two drive control circuits can serve as a gate drive circuit, which is coupled to gate lines and configured to provide gate signals to scanning control transistors.

Although the preferred embodiments of the present disclosure have been described, those skilled in the art can make additional changes and modifications to these embodiments once they know the basic inventive concepts. Therefore, the appended claims are intended to be explained as including the preferred embodiments and all changes and modifications falling within the scope of the present disclosure.

Obviously, those skilled in the art can make various changes and modifications to the embodiments of the present disclosure without departing from the spirit and scope of the embodiments of the present disclosure. Thus, if these changes and modifications of the embodiments of the present disclosure fall within the scope of the claims of the present disclosure and their equivalents, the present disclosure is also intended to include these changes and modifications.

What is claimed is:

1. A shift register unit, comprising:
   an input circuit configured to, in response to a signal from a first clock signal terminal, provide a signal from the input signal terminal to a first node;
   a control circuit configured to control a signal at a second node;
   a first output circuit configured to, in response to a signal from the first node, provide a signal from a first reference voltage signal terminal to an output signal terminal;
   a second output circuit configured to, in response to a signal from the second node, provide a signal from a second reference voltage signal terminal to the output signal terminal; and
   a noise reduction circuit configured to, in response to a signal from a noise reduction signal terminal, provide a signal from a third reference voltage signal terminal to the second node to control the second output circuit to stop outputting a signal;
   wherein the first node comprises a first sub-node and a second sub-node; and
   the shift register unit further comprises a conduction circuit; wherein
      the first sub-node is coupled to the second sub-node via the conduction circuit, and the conduction circuit is configured to, in response to a signal from a fourth reference voltage signal terminal, conduct the first sub-node with the second sub-node;
      the input circuit is further configured to, in response to the signal from the first clock signal terminal, provide the signal from the input signal terminal to the first sub-node; and
      the first output circuit is further configured to, in response to a signal at the second sub-node, provide the signal from the first reference voltage signal terminal to the output signal terminal.

2. The shift register unit according to claim 1, wherein the noise reduction circuit comprises a first transistor;

wherein
a gate of the first transistor is coupled to the noise reduction signal terminal, a first electrode of the first transistor is coupled to the third reference voltage signal terminal, and a second electrode of the first transistor is coupled to the second node.

3. The shift register unit according to claim 1, wherein the control circuit comprises: a first control circuit, a second control circuit, and a third control circuit;
wherein
the first control circuit is configured to, in response to the signal from the first clock signal terminal, provide a signal from a fifth reference voltage signal terminal to a third node, and in response to the signal at the first sub-node, provide the signal from the first clock signal terminal to the third node;
the second control circuit is configured to control the signal at the second sub-node and a signal at a fourth node; and
the third control circuit is configured to, in response to the signal at the fourth node and a signal from a second clock signal terminal, provide the signal from the second clock signal terminal to the second node, and in response to the signal at the first sub-node, provide the signal at the second reference voltage signal terminal to the second node.

4. The shift register unit according to claim 3, wherein the first control circuit comprises: a second transistor and a third transistor;
wherein
a gate of the second transistor is coupled to the first clock signal terminal, a first electrode of the second transistor is coupled to the fifth reference voltage signal terminal, and a second electrode of the second transistor is coupled to the third node; and
a gate of the third transistor is coupled to the first sub-node, a first electrode of the third transistor is coupled to the third node, and a second electrode of the third transistor is coupled to the first clock signal terminal.

5. The shift register unit according to claim 3, wherein the second control circuit is further configured to:
in response to a signal from the fourth reference voltage signal terminal, provide a signal at the third node to the fourth node;
in response to the signal at the third node, provide the signal from the second reference voltage signal terminal to a fifth node; and
in response to the signal at the second sub-node, provide the signal from the second clock signal terminal to the fifth node.

6. The shift register unit according to claim 5, wherein the second control circuit comprises: a fourth transistor, a fifth transistor, a sixth transistor, and a first capacitor;
wherein
a gate of the fourth transistor is coupled to the fourth reference voltage signal terminal, a first electrode of the fourth transistor is coupled to the third node, and a second electrode of the fourth transistor is coupled to the fourth node;
a gate of the fifth transistor is coupled to the third node, a first electrode of the fifth transistor is coupled to the second reference voltage signal terminal, and a second electrode of the fifth transistor is coupled to the fifth node;
a gate of the sixth transistor is coupled to the second sub-node, a first electrode of the sixth transistor is coupled to the fifth node, and a second electrode of the sixth transistor is coupled to the second clock signal terminal; and
a first electrode of the first capacitor is coupled to the fifth node, and the second electrode of the first capacitor is coupled to the second sub-node.

7. The shift register unit according to claim 3, wherein the second control circuit is further configured to:
in response to a signal from the fourth reference voltage signal terminal, provide a signal at the third node to the fourth node;
in response to the signal at the fourth node, provide the signal from the second reference voltage signal terminal to a fifth node; and
in response to the signal at the second sub-node, provide the signal from the second clock signal terminal to the fifth node.

8. The shift register unit according to claim 7, wherein the second control circuit comprises: a fourth transistor, a fifth transistor, a sixth transistor, and a first capacitor;
wherein
a gate of the fourth transistor is coupled to the fourth reference voltage signal terminal, a first electrode of the fourth transistor is coupled to the third node, and a second electrode of the fourth transistor is coupled to the fourth node;
a gate of the fifth transistor is coupled to the fourth node, a first electrode of the fifth transistor is coupled to the second reference voltage signal terminal, and a second electrode of the fifth transistor is coupled to the fifth node;
a gate of the sixth transistor is coupled to the second sub-node, a first electrode of the sixth transistor is coupled to the fifth node, and a second electrode of the sixth transistor is coupled to the second clock signal terminal; and
a first electrode of the first capacitor is coupled to the fifth node, and the second electrode of the first capacitor is coupled to the second sub-node.

9. The shift register unit according to claim 3, wherein the third control circuit comprises: a seventh transistor, an eighth transistor, a ninth transistor, and a second capacitor;
wherein
a gate of the seventh transistor is coupled to the fourth node, a first electrode of the seventh transistor is coupled to the second clock signal terminal, a second electrode of the seventh transistor is coupled to a first electrode of the eighth transistor;
a gate of the eighth transistor is coupled to the second clock signal terminal, and a second electrode of the eighth transistor is coupled to the second node;
a gate of the ninth transistor is coupled to the first sub-node, a first electrode of the ninth transistor is coupled to the second node, and a second electrode of the ninth transistor is coupled to the second reference signal terminal; and
a first electrode of the second capacitor is coupled to the fourth node, and the second electrode of the second capacitor is coupled to the first electrode of the eighth transistor.

10. The shift register unit according to claim 1, wherein the input circuit comprises a tenth transistor;
wherein a gate of the tenth transistor is coupled to the first clock signal terminal, a first electrode of the tenth transistor is coupled to the input signal terminal, and a second electrode of the tenth transistor is coupled to the first sub-node.

11. The shift register unit according to claim 1, wherein the first output circuit comprises an eleventh transistor;
   wherein a gate of the eleventh transistor is coupled to the second sub-node, a first electrode of the eleventh transistor is coupled to the output signal terminal, and a second electrode of the eleventh transistor is coupled to the first reference voltage signal terminal.

12. The shift register unit according to claim 1, wherein the second output circuit comprises a twelfth transistor and a third capacitor;
   wherein
   a gate of the twelfth transistor is coupled to the second node, a first electrode of the twelfth transistor is coupled to the second reference voltage signal terminal, and a second electrode of the twelfth transistor is coupled to the output signal terminal; and
   a first electrode of the third capacitor is coupled to the second node, and a second electrode of the third capacitor is coupled to the second reference voltage signal terminal.

13. The shift register unit according to claim 1, wherein the conduction circuit comprises a thirteenth transistor;
   wherein a gate of the thirteenth transistor is coupled to the fourth reference voltage signal terminal, a first electrode of the thirteenth transistor is coupled to the first sub-node, and a second electrode of the thirteenth transistor is coupled to the second sub-node.

14. The shift register unit according to claim 1, wherein the second reference voltage signal terminal and the third reference voltage signal terminal are the same one signal terminal.

15. A display apparatus, comprising a drive control circuit, wherein the drive control circuit comprises a plurality of shift register units according to claim 1 in cascade; wherein:
   an input signal terminal of a first stage of shift register unit is couple to a frame trigger signal terminal;
   in every two stages of shift register units that are adjacent to each other, an input signal terminal of a next stage of shift register unit is coupled to an output signal terminal of a shift register unit preceding the next stage of shift register unit.

16. A shift register unit, comprising:
   an input circuit, coupled to an input signal terminal and a first node and configured to provide a signal from the input signal terminal to the first node;
   a control circuit, coupled to a second node and configured to control the second node;
   a first output transistor; wherein a gate of the first output transistor is coupled to the second node, a first electrode of the first output transistor is coupled to a second reference voltage signal terminal, and a second electrode of the first output transistor is coupled to an output signal terminal; and the first output transistor is configured to, in response to a signal at the second node, provide a signal from the second reference voltage signal terminal to the output signal terminal;
   a noise reduction transistor; wherein a gate of the noise reduction transistor is coupled to a noise reduction signal terminal, a first electrode of the noise reduction transistor is coupled to a third reference voltage signal terminal, and a second electrode of the noise reduction transistor is coupled to the second node; and the noise reduction transistor is configured to, in response to a signal from the noise reduction signal terminal, provide a signal from the third reference voltage signal terminal to the second node;
   a third capacitor; wherein a first electrode of the third capacitor is coupled to the second reference voltage signal terminal, and a second electrode of the third capacitor is coupled to the second electrode of the noise reduction transistor; and
   a second output transistor, wherein a gate of the second output transistor is couple to the first node, a first electrode of the second output transistor is coupled to the first reference voltage signal terminal, and a second electrode of the second output transistor is coupled to the output signal terminal; and the second output transistor is configured to, in response to the signal at the first node, provide a signal from the first reference voltage signal terminal to the output signal terminal.

17. The shift register unit according to claim 16, wherein the second reference voltage signal terminal and the third reference voltage signal terminal are the same one signal terminal.

* * * * *